United States Patent

Bernard et al.

[11] Patent Number: 6,035,726
[45] Date of Patent: *Mar. 14, 2000

[54] HOT-WIRE MASS FLOWMETER

[75] Inventors: Marc Bernard, Saint Florent; Eric Collet, Saint Doulchard, both of France

[73] Assignee: Auxitpol S.A., France

[*] Notice: This patent issued on a continued prosecution application filed under 37 CFR 1.53(d), and is subject to the twenty year patent term provisions of 35 U.S.C. 154(a)(2).

[21] Appl. No.: 08/787,129

[22] Filed: Jan. 22, 1997

[51] Int. Cl.$^7$ ...................................................... G01F 1/68
[52] U.S. Cl. ..................................... 73/861.95; 73/204.14
[58] Field of Search ........................ 73/861.95, 861.05, 73/204.13, 204.14, 204.15, 204.25, 204.27

[56] References Cited

U.S. PATENT DOCUMENTS

| | | | |
|---|---|---|---|
| 3,603,147 | 9/1971 | Dorman | 73/204.14 |
| 3,719,083 | 3/1973 | Morris et al. | 73/204.14 |
| 4,335,605 | 6/1982 | Boyd | 73/204.14 |
| 4,621,929 | 11/1986 | Phillips | 73/861.22 |
| 4,888,987 | 12/1989 | Zhang | 73/204.14 |
| 5,004,913 | 4/1991 | Kleinerman | 73/714 |
| 5,493,100 | 2/1996 | Renger | 73/204.14 |
| 5,661,236 | 8/1997 | Thompson | 73/152.31 |
| 5,710,380 | 1/1998 | Talley et al. | 73/861.85 |

FOREIGN PATENT DOCUMENTS

| | | | |
|---|---|---|---|
| 0 206 215 | 6/1986 | European Pat. Off. | G01F 1/68 |
| 0 210 509 | 7/1986 | European Pat. Off. | G01F 1/68 |
| 0 269 823 | 10/1987 | European Pat. Off. | A61B 5/08 |
| 28 45 662 | 10/1978 | Germany | G01F 1/68 |
| 1 345 324 | 4/1970 | United Kingdom | G01F 1/00 |
| 83 00227 | 7/1982 | WIPO | G01N 25/18 |

*Primary Examiner*—Harshad Patel
*Attorney, Agent, or Firm*—Blakely Sokoloff Taylor & Zafman

[57] ABSTRACT

A mass flowmeter including a resistive wire adapted to be placed across the path of a fluid whose flow rate is to be measured, a controller unit for applying electrical energy to the wire, and a processor unit for deducing the mass flow rate of the fluid from variations in the temperature of the fluid. In one embodiment, the controller unit applies current pulses to the wire during given periods and the processor unit determines the rate at which the wire cools between pulses. The invention is applicable to measuring any mass flow rate in various environments.

9 Claims, 3 Drawing Sheets

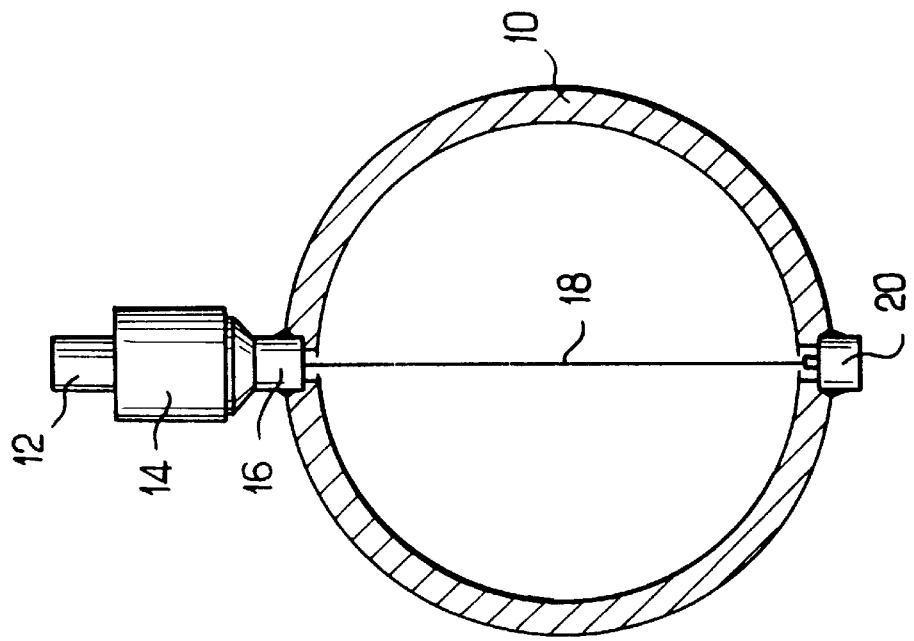
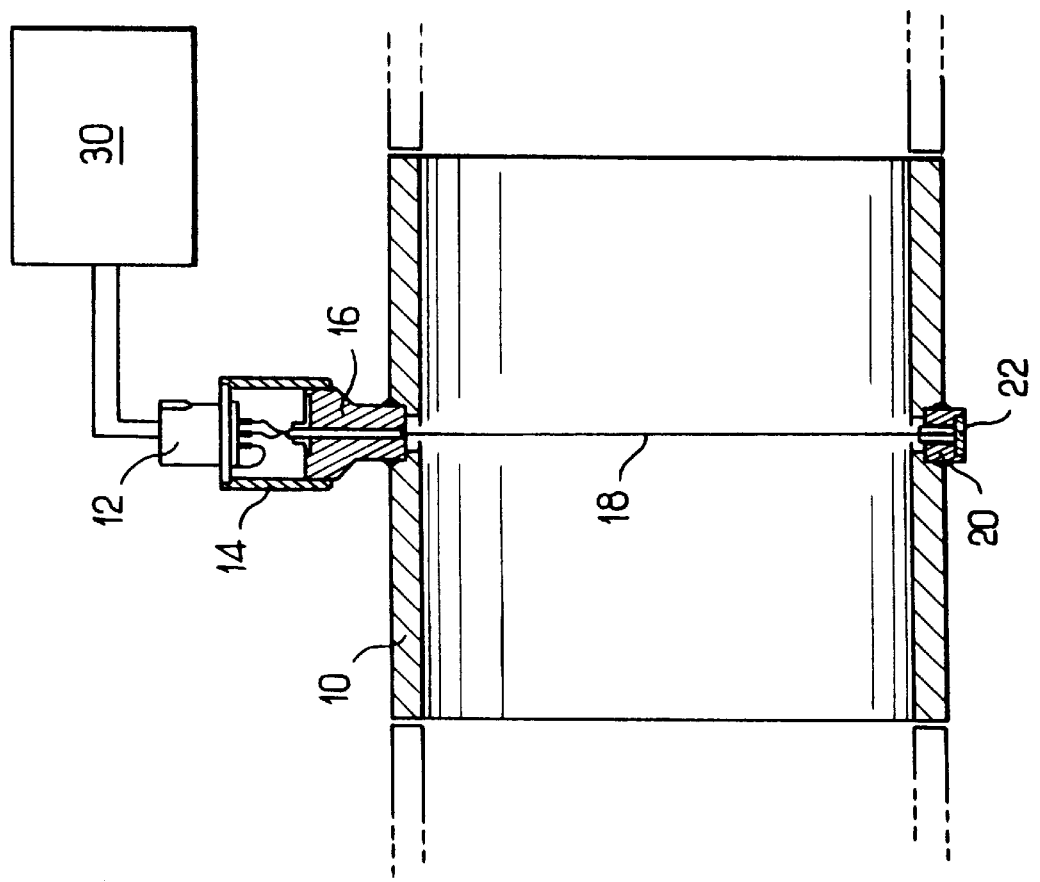

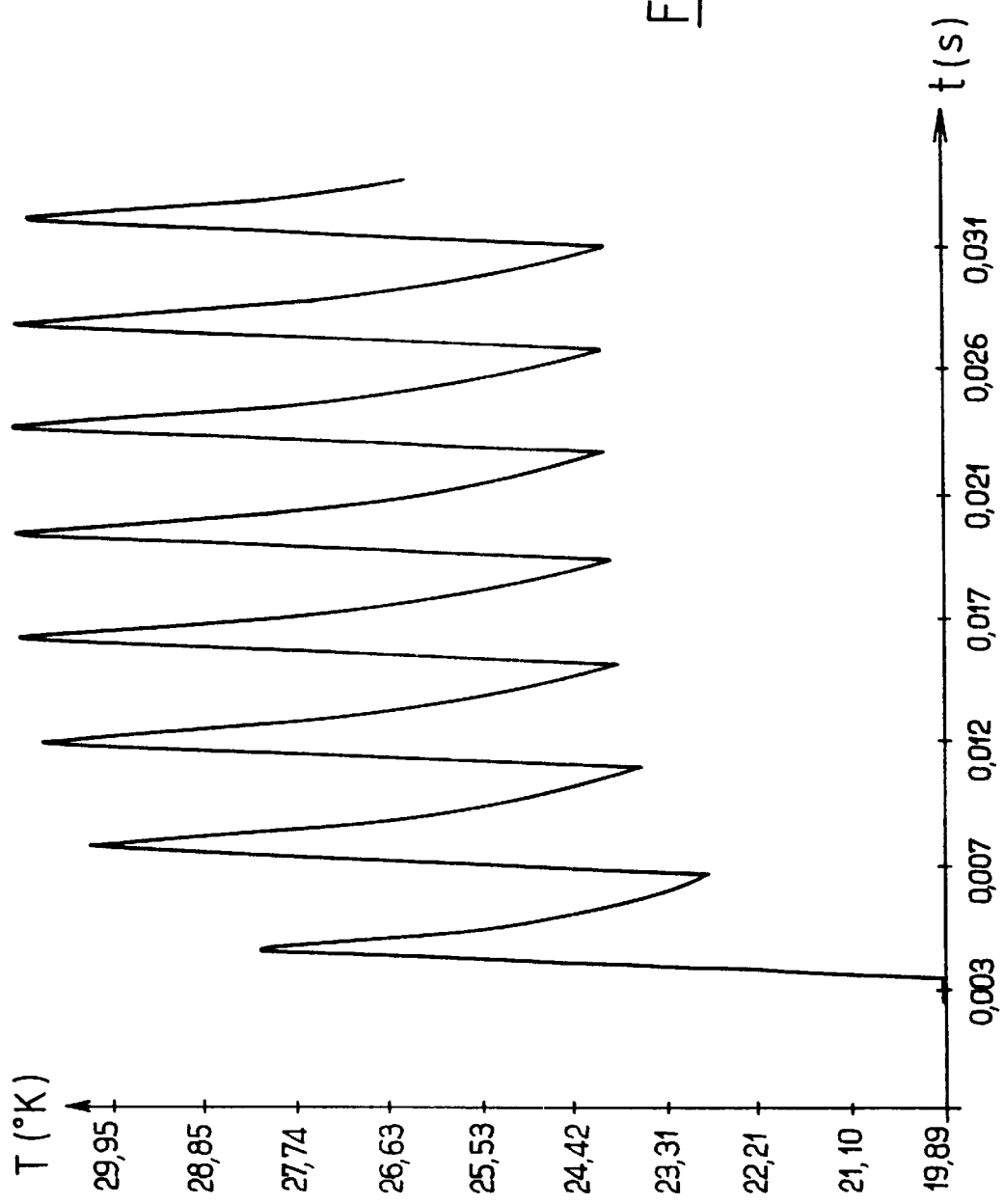
FIG_3

HOT-WIRE MASS FLOWMETER

The present invention relates in general to flowmeters.

Measuring flow rate is an important requirement in many experimental and industrial applications.

The prior art contains a large number of devices for measuring volume flow rates of fluids, e.g. based on spinners driven by the fluid or by measuring forces exerted by the fluid on a surface placed in the fluid flow.

Those known techniques are generally relatively inaccurate, and in addition they are limited to measuring volume flow rate, without being capable of providing a measurement of mass flow rate. Thus, a volume flow rate cannot show up the fact that bubbles of gas are contained in a flow.

To measure the mass flow rate of a fluid in a duct, it is necessary to use a sensor capable of responding to the term $\rho V$ (where $\rho$ is density and V is rate), and of integrating this term across the section of the duct.

The mass flow rate along the duct is $\iint_s \rho V.dS$.

Mass flowmeters are known that are based on the hot-wire technique. Advantages of that measuring technique lie in a response time that is generally good and in the fact that there are no moving parts.

The operation of a hot-wire mass flowmeter is based on the principle whereby the forced convection due to the fluid over the wire varies monotonically with the specific mass flow rate $\rho V$ of the fluid.

There are several known ways of operating hot-wire mass flowmeters. A first consists in causing an electrical current to flow in a wire that has a certain amount of resistance and that is exposed to the fluid flow, and to maintain the temperature of the wire at a constant value. The fluid flow rate is deduced from the current required to maintain the temperature.

In a second technique, the quantity of electrical energy required for raising the wire to a given temperature is measured. Document EP-A-0 206 215, in particular, illustrates that technique.

More generally, a hot wire can be used by varying the current that flows along it and by analyzing the dynamic behavior of the voltage at the terminals of the wire.

Nevertheless, such known hot-wire flowmeters are either complex in structure and operation, or else relatively inaccurate concerning the resulting measurement.

Also, they all require a reference hot wire for determining the temperature of the fluid.

The present invention seeks to provide a hot-wire flowmeter which is extremely simple and cheap to implement, while providing a flow rate measurement of good accuracy, and which does not require any reference information.

To this end, the invention provides a mass flowmeter of the type comprising a resistive wire placed in the path of a fluid whose flow rate is to be measured, feed means for applying electrical energy to the wire, and measurement means for deducing the mass flow rate of the fluid from variations in the temperature of the fluid, characterized in that the feed means comprise control means for applying current pulses to the wire during given periods, and in that the measurement means comprise means for determining the rate at which the wire cools between said periods.

Preferred, but non-limiting aspects of the flowmeter of the invention are as follows:

the pulses are constant current pulses of constant width;

the feed means are suitable for applying a very low constant current to the wire between said given periods, and the measurement means comprise means for determining the rate at which the voltage across the terminals of the wire varies between said periods;

the measurement means include means for taking the derivative of said voltage;

the flowmeter has a single resistive wire placed across a fluid passage of rectangular section;

the flowmeter comprises two resistive wires connected in series and disposed diametrically across a circular section fluid passage, and inclined relative to each other;

the control means are suitable for varying the level of the current pulses so that each current pulse applies the same electrical power to the resistive wire; and the control means are suitable for causing at least one current pulse parameter selected from level, pulse width, and spacing between pulses to vary in such a manner as to maintain the resistive wire within close-together temperature ranges for different flow rate values.

Other aspects, objects, and advantages of the present invention appear more clearly on reading the following detailed description of preferred embodiments of the invention given by way of non-limiting example and made with reference to the accompanying drawings, in which:

FIG. 1 is an axial vertical section view through a hot-wire mass flowmeter of the invention;

FIG. 2 is a cross-section view of the FIG. 1 flowmeter;

FIG. 3 is a graph showing wire temperature as a function of time; and

Figure 4:
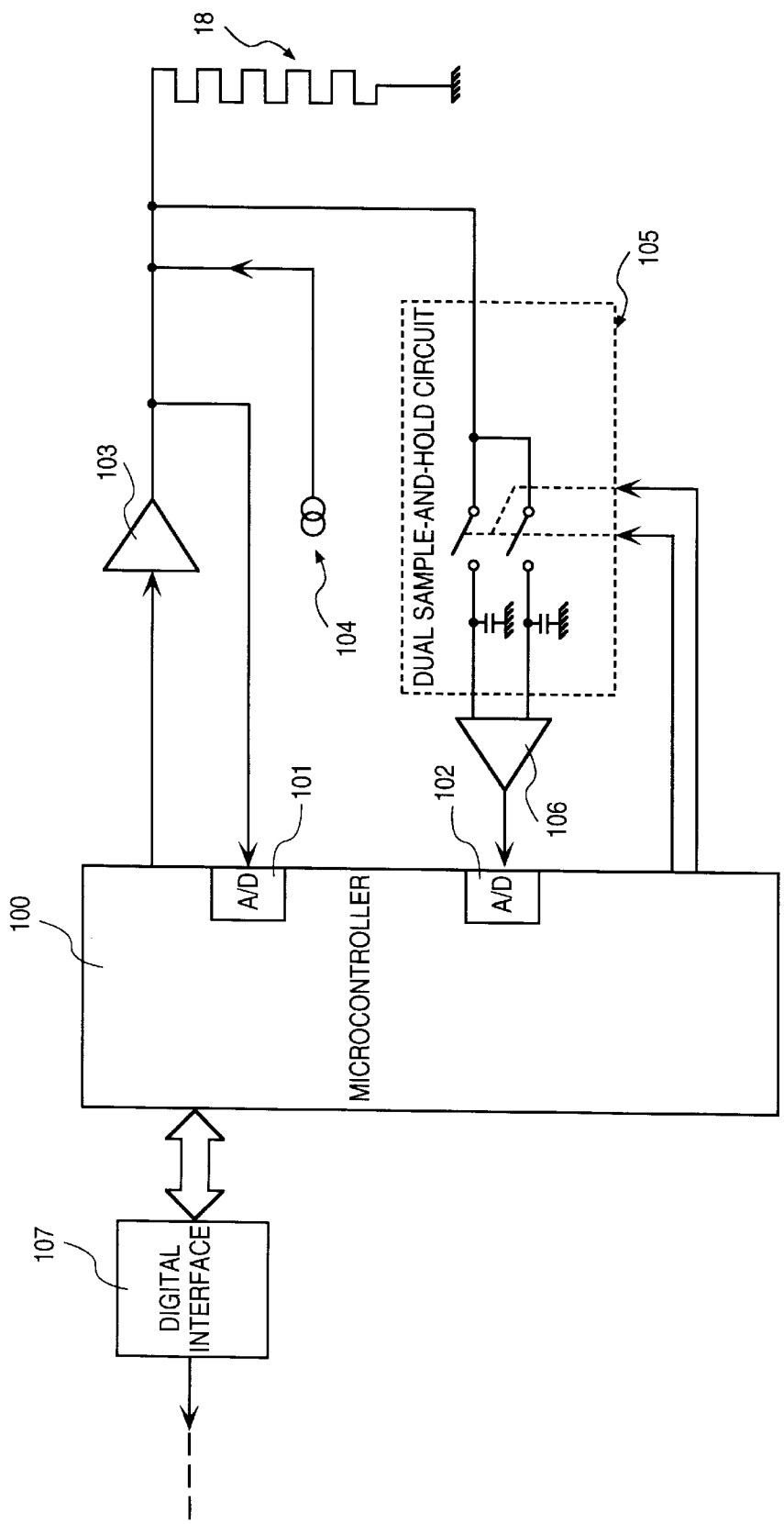
FIG. 4 is a block diagram of an embodiment of a processor unit for a flowmeter of the invention.

Reference is made initially to FIGS. 1 and 2 showing a physical embodiment of a hot-wire mass flowmeter of the invention which comprises a generally cylindrical hollow body 10 through which the fluid whose mass flow rate is to be measured is caused to pass. The body 10 is connected to fluid delivery and discharge ducts via appropriate leakproof means.

A resistive wire 18 extends diametrically across the body 10, with the bottom end of the wire being crimped in a cylindrical ring 20 welded in a hole through the body 10. A sealing plug 22 is itself welded to the bottom face of the ring.

The resistive wire 18 is in fact constituted by a resistive conductor folded through 180° at its bottom end comprises two strands in a sheath.

The resistive wire is preferably a shielded wire made in the form of a mineral-insulated cable, said insulation being highly compacted magnesia. The assembly is preferably of small diameter, about 0.5 mm, so as to present dynamic behavior that is satisfactory for measuring the flow rate by measuring the cooling gradient. Such cables are well known in the field of thermocouples.

When measuring flow rate at cryogenic temperatures (of the order of a few tens of K), the resistive wire must be designed to be of sufficient strength and to maintain sufficient resistance since superconductivity is being approached. Under such circumstances, it is preferable for the wire to be a rhodium/iron alloy.

At its top end, the resistive wire passes in electrically insulating manner through a central bore in a mount 16 fixed in another hole through the body 10 by welding. The wire is fixed to the mount 16. A ring 14 is welded peripherally to the top of the mount and a connector 12 is welded to the top of the ring for connection to an associated electronic circuit (not shown). Conductors connect the connector 12 both to the top end of the resistive conductor of the wire 18 and to the top end of the non-resistive conductor thereof, the resistive and non-resistive conductors being connected together at their bottom end.

In a variant, when the body 10 is electrically conductive, the resistive wire may be connected to the body at its bottom end, and its resistance is measured between its top end and the body. Under such circumstances, means are provided to avoid problems of electromagnetic interference that could arise because of the resulting lack of shielding.

Finally, the resistive wire 18 is connected via the connector 12 to an electronic processor unit 30 whose function is described in detail below.

According to an essential aspect of the present invention, the resistive wire is heated by applying well-determined current pulses thereto and the gradient of the cooling curve of the wire between successive pulses being monitored by passing a low and non-significant current through the wire (as explained below).

As explained in greater detail below, the gradient can be used to determine the mass flow rate of the fluid.

The electronic circuit of the flowmeter is designed to determine continuously the voltage U across the terminals of the wire and the current I flowing along the wire. The instantaneous value of its resistance $R=U/I$ is deduced therefrom, thus determining the instantaneous value of its temperature, since resistance varies as a function of temperature in application of a monotonic relationship that is known beforehand.

Because measurement is performed by determining a gradient (differential measurement), the flowmeter of the invention does not require a reference, unlike most previously known systems. The wire 18 thus acts both as heater means and as measurement means.

The flowmeter of the invention is thus insensitive to variations in the temperature of the fluid whose flow rate is to be measured.

With the wire 18 disposed along a diameter of the fluid passage, integration of the variable $\rho V$ for determining the mass flow rate is performed only on that diameter, and not across the entire section of the passage. Nevertheless, assuming that the fluid flow is symmetrical across the duct (as is the case for flow with a boundary layer), a diametrically-extending wire enables mass flow rate to be determined with good accuracy. The accuracy is improved for a flow section that is close to being square or rectangular in shape, but it remains entirely satisfactory for a passage that is circular in section.

In a variant embodiment (not shown), the flowmeter may comprise two hot wires disposed diametrically, and extending at 90° to each other, for example, thereby making it possible to take account of possible asymmetry in the flow.

Under such circumstances, the two resistive wires are connected in series.

The processor unit associated with the assembly shown in FIGS. 1 and 2 includes clocked means for applying current pulses to the wire, with each pulse having the same constant level, and the same well-determined duty ratio. It also includes means capable, during each period between two successive current pulses, of acquiring the temperature of the wire by measuring its resistance. To enable said measurement to be performed, it is necessary to pass a very low constant current along the wire, with the value of this current being selected so that it does not influence the thermal behavior of the wire while it is cooling. For example, this current can be selected so as to deliver a power of a few milliwatts as compared with several tens of watts during the current pulses proper. In this way, the temperature of the wire during periods of cooling is directly proportional to the voltage across its terminals.

The processor unit includes a circuit for taking the derivative of said voltage, with the derivative obtained in this way giving the fluid flow rate directly.

The various parameters (current, pulse width, spacing between pulses) are preferably selected so as to avoid as far as possible non-linearities between variation in flow rate and variation in cooling rate.

The processor unit can also be designed to compensate for such non-linearities, in particular by making use of weighting coefficients.

The processor unit is preferably constructed around a suitably programmed microcontroller provided with input/output circuits, and in particular appropriate digital-to-analog and analog-to-digital converters.

A specific embodiment of the processor unit is described briefly below.

It comprises a microcontroller or microprocessor 100 controlling an amplifier 103 for delivering heating current to the resistive wire 18. The wire 18 is connected between the output of the current amplifier 103 and ground.

The voltage at the output of the amplifier 103 is applied to the analog input of an analog-to-digital converter 101 associated with the microcontroller, to obtain therein a digital value representative of the voltage across the terminals of the resistive wire.

A constant current generator 104 for generating a low value current is also connected to the top terminal of the resistive wire 18 so as to apply a low current thereto enabling the voltage across its terminals to be measured during cooling periods without having significant influence on said cooling.

Finally, the top terminal of the resistive wire 18 is connected to the input of a dual sample-and-hold circuit 105 controlled by the microcontroller 100 and having its output connected through an intervening amplifier 106 to the input of a second analog-to-digital converter 102 associated with the microcontroller.

The microcontroller communicates with a central computer (not shown) via a suitable digital interface 107.

FIG. 3 shows how the voltage across the terminals of the hot wire, and thus its temperature (plotted up the ordinate in K) varies as a function of time (plotted along the abscissa in seconds).

In this example, the width of the current pulses was 1 ms, the period of the pulses was 4 ms, and the current was such that the Joule power applied to the wire was 25 watts. The electrical resistance of the wire was 2 Ω. The signals were picked up while causing liquid hydrogen to flow through the flowmeter at a rate lying around 100 kg/m².s.

In the example described, constant current pulses of predetermined width were applied to the resistive wire.

In a variant, it is possible to apply pulses of constant electrical power to the wire. In other words, given continuous knowledge of the voltage $U_f$ across the terminals of the wire, the value of the heating current $I_f$ to be applied thereto is determined in such a manner that $U_f \cdot I_f = a$ constant.

This makes it possible to avoid measurement inaccuracies that can arise because of significant temperature differences in the wire, by ensuring that the temperature of the wire varies over the same range of values regardless of whether the flow rate is high or low.

The processor unit may also be designed so as to work the wire over different ranges, as a function of the range of flow rates over which measurements are to be taken.

Range can be changed either by changing the value of the heating current or by changing the width of the heating pulses, or by changing both of them.

The processor unit may be designed to perform such a range change in self-adaptive manner as a function of variations encountered in the flow rate.

In conclusion, a flowmeter is provided that is simple, robust, reliable, and above all insensitive to the temperature of the fluid, and that has a response time that is extremely short (of the order of a few milliseconds).

Naturally, the present invention is not limited in any way to the embodiments described and shown, but the person skilled in the art will know how to apply variants or modifications thereto within the spirit of the invention.

We claim:

1. A mass flowmeter comprising:

a resistive wire adapted to be placed in a path of a fluid whose flow rate is to be measured;

feed means for applying electrical energy to the wire, the feed means includes control means for applying current pulses to the wire during given periods;

measurement means without using a thermal reference for deducing the mass flow rate of the fluid from variations in the temperature of the fluid, wherein the measurement means determines the mass flow rate using the gradient of the cooling curve of the wire between successive pulses monitored by passing a low and non-significant current through the wire and determines the rate at which the wire cools between said pulses.

2. The mass flowmeter of claim 1, wherein the pulses are constant current pulses of constant width.

3. The flowmeter of claim 1 or claim 2, wherein said wire is a single resistive wire adapted to be placed across a fluid passage of rectangular section.

4. The flowmeter of claim 1 or claim 2, wherein the control means is adapted to vary the level ($I_f$) of the current pulses so that each current pulse applies the same electrical power to the resistive wire.

5. The flowmeter of claim 1 or claim 2, wherein the control means is adapted to cause at least one current pulse parameter selected from level, pulse width, and spacing between pulses to vary in such a manner as to maintain the resistive wire within close-together temperature ranges for different flow rate values.

6. A mass flowmeter comprising:

a resistive wire placed in a path of a fluid to measure the fluid's flow rate;

feed means for applying electrical energy to the wire;

measurement means without using a thermal reference for deducing the mass flow rate of the fluid from variations in the temperature of the fluid;

the feed means includes a control means for applying current pulses to the wire during given periods;

the control means is adapted to apply a very low constant current to the wire between said periods; and the measurement means without using a thermal reference determines the mass flow rate using the gradient of the cooling curve of the wire between successive pulses monitored by passing a low and non-significant current through the wire by determining the rate at which the voltage across the terminals of the wire varies between said periods.

7. The flowmeter of claim 6, wherein the measurement means includes means for taking the derivative of said voltage.

8. A mass flowmeter comprising:

a resistive wire adapted to be placed in a path of a fluid whose flow rate is to be measured;

feed means for applying electrical energy to the wire, the feed means includes control means for applying current pulses to the wire during given periods;

measurement means without using a thermal reference for deducing the mass flow rate of the fluid from variations in the temperature of the fluid, wherein the measurement means determines the mass flow rate using the gradient of the cooling curve of the wire between successive pulses monitored by passing a low and non-significant current through the wire and the measurement means determines the rate at which the wire cools between said pulses.

9. A mass flowmeter comprising:

a resistive wire placed in apath of a fluid to measure the fluid's flow rate;

feed means for applying electrical energy to the wire;

measurement means without using a thermal reference for deducing the mass flow rate of the fluid from variations in the temperature of the fluid;

the feed means includes a control means for applying current pulses to the wire during given periods;

the control means is adapted to apply a very low constant current to the wire between said periods;

the measurement means without using a thermal reference determines the mass flow rate using the gradient of the cooling curve of the wire between successive pulses monitored by passing a low and non-significant current through the wire and the measurement means determines the rate at which the voltage across the terminals of the wire varies between said periods.

* * * * *

UNITED STATES PATENT AND TRADEMARK OFFICE
CERTIFICATE OF CORRECTION

PATENT NO. : 6,035,726
DATED : March 14, 2000
INVENTOR(S) : Bernard et al.

It is certified that error appears in the above-identified patent and that said Letters Patent is hereby corrected as shown below:

In [73], delete "Auxitpol" and insert -- Auxitrol -- .

In column 3, line 16, delete "wire between successive pulses being monitored" and insert -- wire between successive pulses is monitored -- .

In column 6, line 30, delete "wire placed in apath" and insert -- wire placed in a path -- .

Signed and Sealed this

Third Day of April, 2001

Attest:

NICHOLAS P. GODICI

*Attesting Officer*   Acting Director of the United States Patent and Trademark Office